(12) United States Patent
Wen

(10) Patent No.: US 7,221,479 B2
(45) Date of Patent: May 22, 2007

(54) METHOD FOR AVOIDING MULTIPLE COLOR MOIRÉS IN COLOR HALFTONING

(75) Inventor: Zhenhuan Wen, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 941 days.

(21) Appl. No.: 10/449,424

(22) Filed: May 30, 2003

(65) Prior Publication Data

US 2004/0239967 A1    Dec. 2, 2004

(51) Int. Cl.
H04N 1/52 (2006.01)
H04N 1/58 (2006.01)

(52) U.S. Cl. .................. 358/1.9; 358/3.26; 358/533; 358/536

(58) Field of Classification Search ........ 358/533–536, 358/3.2, 3.06, 3.26, 1.9
See application file for complete search history.

(56) References Cited

U.S. PATENT DOCUMENTS

| | | | |
|---|---|---|---|
| 5,381,247 A | 1/1995 | Hains | 358/533 |
| 6,798,539 B1 * | 9/2004 | Wang et al. | 358/1.9 |
| 6,972,871 B2 * | 12/2005 | Tsuda et al. | 358/1.9 |
| 6,985,256 B2 * | 1/2006 | Cheng et al. | 358/1.9 |
| 6,985,262 B2 * | 1/2006 | Wang | 358/3.26 |

OTHER PUBLICATIONS

Wang, et al, Method for Moire-Free Color Halftoning Using Non-Orthogonal Cluster Screens, filed Oct. 30, 2000.
Cheng, et al, Halftoning Using Dot and Line Screens to Avoid Two and Three Color Moire, filed Jul. 19, 2001.

* cited by examiner

Primary Examiner—Scott A. Rogers
(74) Attorney, Agent, or Firm—Joseph M. Young

(57) ABSTRACT

A method for halftoning an image, including receiving image data including a plurality of color separations and comparing image data for first, second, third, and fourth separations to first, second, third, and fourth halftone screens. The screens are characterized by first, second, third, and fourth pairs of frequency vectors, respectively. The fourth pair of frequency vectors is identical to one of the first, second, and third pairs of frequency vectors. Further, the first, second, third, and fourth screens have an associated fill-in sequence, where the fill-in sequence of the fourth screen is such that overlap between the separation corresponding to the fourth screen and the separation corresponding to the one of the first, second, and third screens to which the fourth screen has an identical pair of frequency vectors does not occur until a combined dot area coverage of the separations is greater than 100%.

22 Claims, 6 Drawing Sheets

FIG. 5
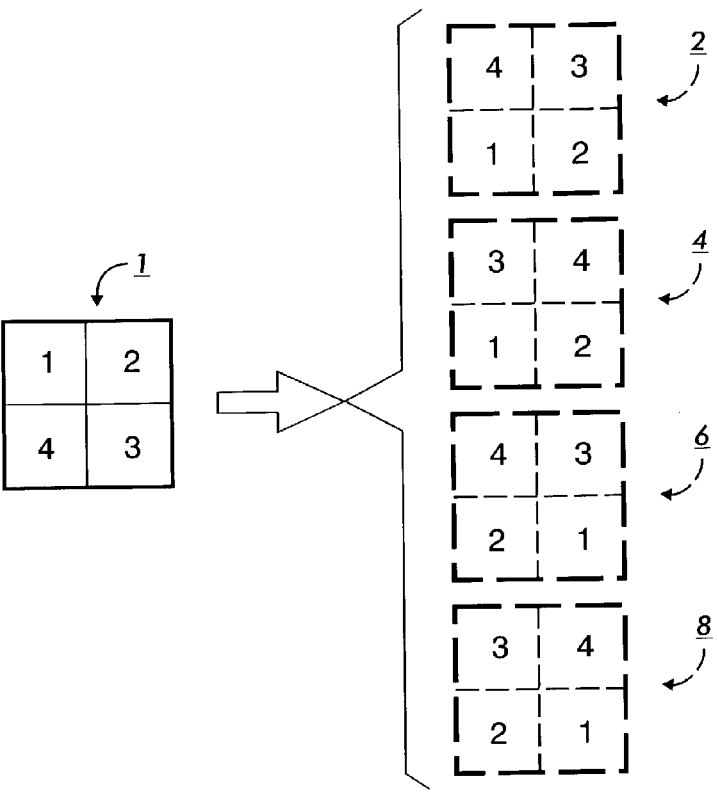
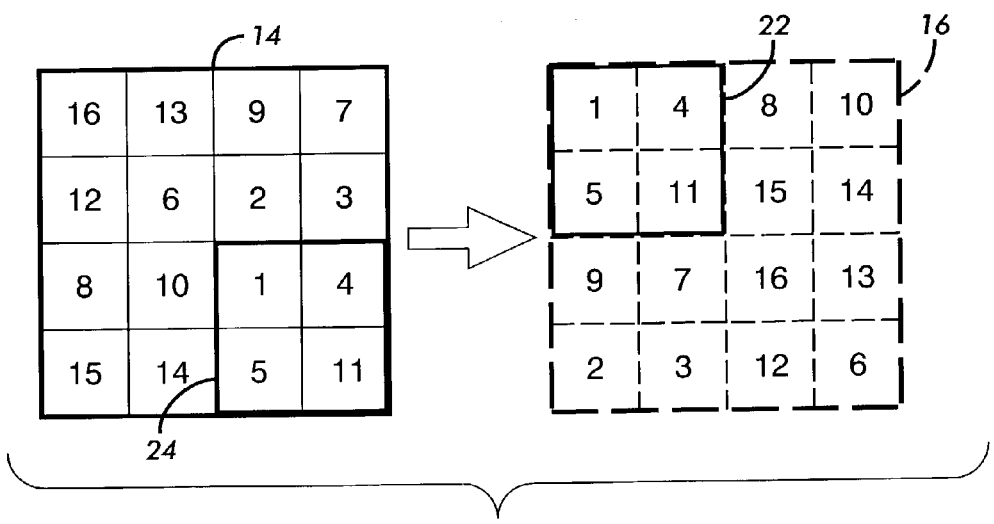
FIG. 6

METHOD FOR AVOIDING MULTIPLE COLOR MOIRÉS IN COLOR HALFTONING

The present invention relates to color halftoning methods and more specifically to halftoning methods that avoid the production of moiré patterns With the advent of inexpensive digital color printers, methods and systems of color digital halftoning have become increasingly important. It is well understood that most digital color printers operate in a binary mode, i.e., for each color separation, a corresponding color spot is either printed or not printed at a specified location or pixel. Digital halftoning controls the printing of color spots, where spatially averaging the printed color spots of all the color separations provides the illusion of the required continuous color tones.

The most common halftone technique is screening, which compares the required continuous color tone level of each pixel for each color separation with one of several predetermined threshold levels. The predetermined threshold levels are stored in a halftone cell, which is spatially replicated and tiled to form a halftone screen that is the size of a given image. If the required color tone level is darker than the threshold halftone level, a color spot is printed at the specified pixel. Otherwise the color spot is not printed. It is understood in the art that the distribution of printed pixels depends on the design of the halftone cell. For cluster halftone cells, all printed pixels are grouped into one or more clusters. If a cluster-halftone cell only generates a single cluster, it is referred to as a single-center halftone screen, a single-dot halftone cell, a single-cell halftone dot, or some similar terminology. Alternatively, halftone cells may be dual-dot, tri-dot, quad-dot, supercells or the like, where supercells are halftone cells with multiple dot centers used to increase the angular accuracy of the screen or the number of gray levels that the screen can produce. As is the practice in the art, the terms "cells" and "screens" are used here somewhat interchangeably.

Halftone cells are typically two-dimensional threshold arrays and are relatively small in comparison to the overall image or document to be printed. Therefore, for a given color separation, the screening process uses an identical halftone cell to tile the complete image plane. The output of the screening process, using a single-cell halftone dot, includes a pattern of multiple small "dots", which are regularly spaced and is determined by the size and the shape of the halftone cell. Typically, the shape and tiling geometry of the halftone cell is a square, rectangle, parallelogram, line, or the like. Various digital halftone screens having different shapes and angles are described in An Optimum Algorithm for Halftone Generation for Displays and Hard Copies, by T. M. Holladay, Proc. Soc. for Information Display, 21, p. 185 (1980). Hexagonal tiling has also been in employed in the halftoning art. The screening output, for square, rectangular or parallelogram tiling as a two-dimensionally repeated pattern, possesses two fundamental spatial frequency vectors, which are completely defined by the geometry of the halftone cell.

A common problem that arises in digital color halftoning is the occurrence of moiré patterns. Moiré patterns are undesirable interference patterns that occur when two or more color halftone separations are printed over each other. Since color mixing during the printing process is a non-linear process, frequency components other than the fundamental frequencies of the two or more color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequencies, which will be visibly evident as a very pronounced moiré interference pattern in the output. To avoid, for example, two-color moiré patterns due to misalignment, or for other reasons, different halftone screens are commonly used for different color separations, where the fundamental frequency vectors of the different halftone screens are separated by relatively large angles. Therefore, the frequency difference between any two fundamental frequencies of the different screens will be large enough so that no visibly noticeable moiré patterns are produced.

In selecting different halftone screens, for example, for three color separations, it is desirable to avoid any two-color moiré as well as any three-color moiré. It is well known that in the traditional printing industry that three halftone screens, constructed of cells which are square in shape and identical, can be placed at 15°, 45° and 75°, respectively, from a point of origin, to provide the classical three-color moiré-free solution. This is described in Principles of Color Reproduction, by J. A. G. Yule, John Wiley & Sons. N.Y. 1967.

Traditional color halftoning approach uses C, M, Y, and K orthogonal clustered dot screens, with C, M, and K screens separated by 30° to avoid objectionable three-color moiré (secondary moiré). The Y screen is usually set at 15° from any two of the C, M, and K screens, and often produces objectionable two-color moiré (primary moiré) by beating with one of those screens.

Since digital color halftoning has constraints on arbitrary angle rotation, the moiré-free CMK screens solutions are obtained by using non-orthogonal cluster halftone dots. The choice for placement of the fourth color, usually yellow for CMYK printing devices, relies on other approaches, such as using a stochastic screen, a line screen, or a high screen frequency cluster dot compared to other CMK screens in order to avoid objectionable two-color and/or three-color moirés between the fourth color and the others. These choices of screen for the yellow component of an image may cause problems because the printing device cannot handle high frequency dots well (where, for example a stochastic screen or a high screen frequency cluster dot was used), the output may yield an ugly rosette pattern (where, for example, a line screen was used), or some objectionable multiple color moiré may be brought on by the yellow screen (where, for example, a high screen frequency cluster dot was used).

Embodiments include a method for halftoning an image, including receiving image data including a plurality of color separations and comparing image data for first, second, third, and fourth separations to first, second, third, and fourth halftone screens. The screens are characterized by first, second, third, and fourth pairs of frequency vectors, respectively. The fourth pair of frequency vectors is identical to one of the first, second, and third pairs of frequency vectors. Further, the first, second, third, and fourth screens have an associated fill-in sequence, where the fill-in sequence of the fourth screen is such that overlap between the separation corresponding to the fourth screen and the separation corresponding to the one of the first, second, and third screens to which the fourth screen has an identical pair of frequency vectors does not occur until a combined dot area coverage of the separations is greater than 100%.

Various exemplary embodiments of this invention will be described in detail, with reference to the following figures, wherein:

FIG. 5 illustrates an exemplary threshold array for a black color halftone screen and corresponding threshold arrays of a yellow color halftone screen that satisfy the present invention.

FIG. 6 illustrates an exemplary threshold array of a black color halftone screen and a corresponding exemplary threshold array of a yellow color halftone screen that cause the same effect as the threshold arrays of FIG. 5.

It is well known that color halftone printers are susceptible to moiré patterns if the halftone dots of a given color separation spatially overlap the halftone dots of another color separation. Techniques for solving for and eliminating three-color moiré patterns from images have already been disclosed in, for example, U.S. application Ser. No. 09/698,104, filed Oct. 30, 2000, entitled "METHOD FOR MOIRÉ-FREE COLOR HALFTONING USING NON-ORTHOGONAL CLUSTER SCREENS" and U.S. application Ser. No. 09/909,319 filed Jul. 19, 2001, entitled "HALFTONING USING DOT AND LINE SCREENS TO AVOID TWO AND THREE COLOR MOIRÉ", both of which are incorporated herein by reference.

Each color screen encompasses at least one single-cell halftone dot. A single-cell halftone dot does not necessarily have to be square in shape. It is beneficial to consider the single-cell halftone dot as having a more general shape, such as, for example, a non-orthogonal parallelogram. Squares are a particular subset of parallelograms. Therefore, the following discussion regarding exemplary non-orthogonal parallelograms can be equally applied to orthogonal or even square halftone dots, as desired.

Figure 1:
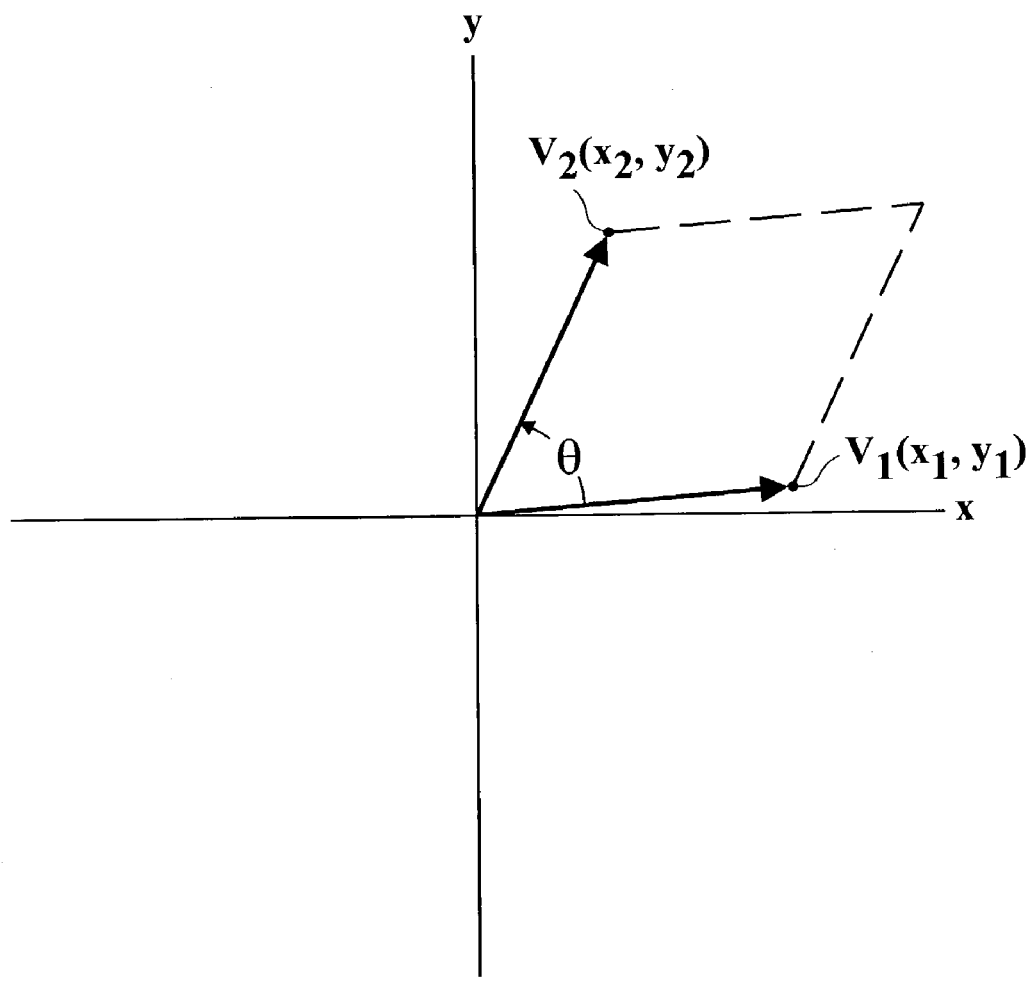
FIG. 1 is a two-dimensional spatial vector representation of a single-cell halftone screen.

To this end, as shown in FIG. 1, a single-cell halftone dot can be an arbitrarily shaped parallelogram and can be represented in the spatial domain by two vectors, $V_1=(x_1, y_1)$ and $V_2 (x_2, y_2)$ Spatial coordinate values $x_1$, $y_1$, $x_2$, and $y_2$ specify the two spatial vectors $V_1$ and $V_2$. If the given single-cell halftone dot represented by the graph shown in FIG. 1 is used by a halftone screening system, the output will appear as a two-dimensional repeated or "tiled" pattern.

Figure 2:
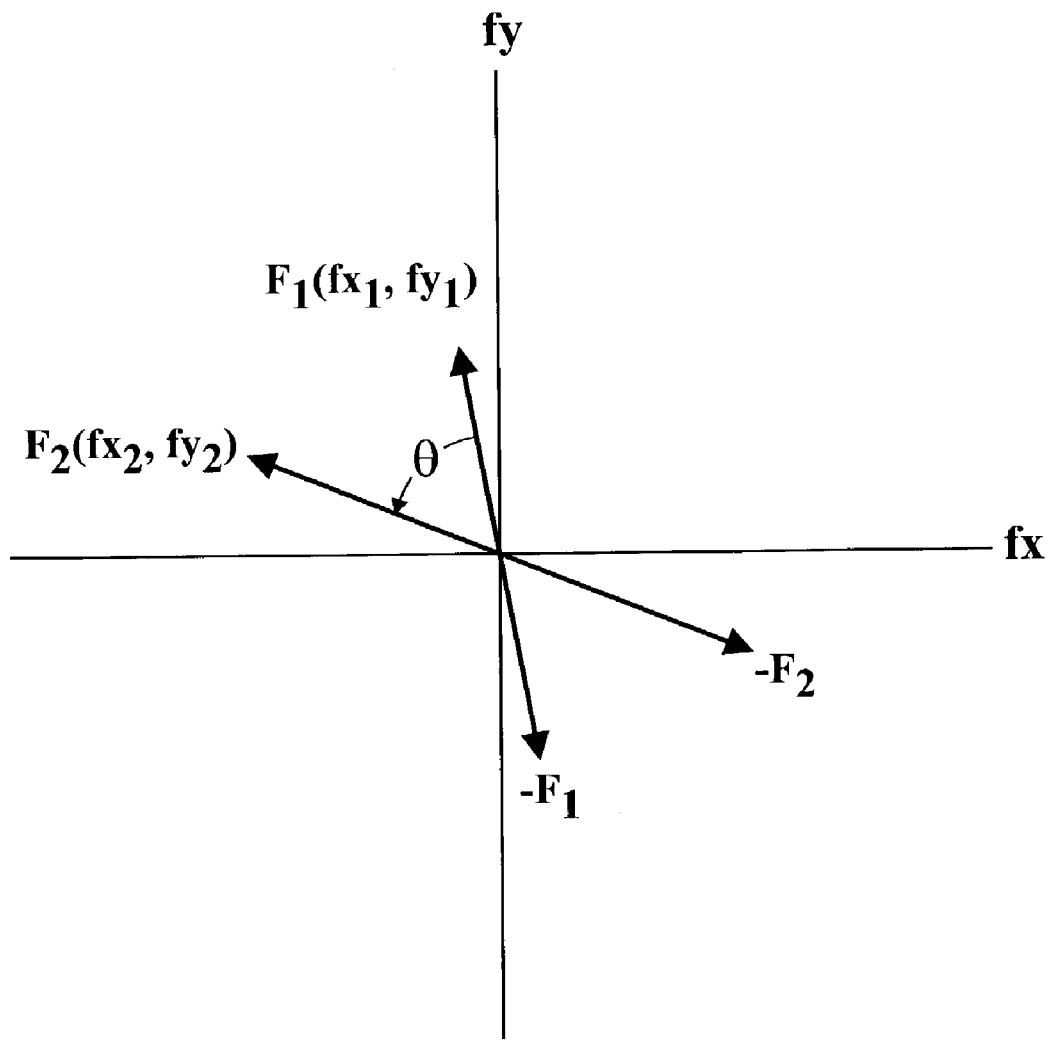
FIG. 2 is a frequency vector representation of the halftone screen of FIG. 1

It should be appreciated that, by using Fourier analysis, a two-dimensional repeated pattern can be represented in the frequency domain by two frequency vectors, $F_1=(f_{X_1}, f_{Y_1})$ and $F_2=(f_{X_2}, f_{Y_2})$. FIG. 2 illustrates, for example, the two frequency vectors, $F_1$ and $F_2$, corresponding to the Fourier transforms of the two spatial vectors, $V_1$ and $V_2$, respectively. It should also be appreciated that the two frequency vectors $F_1$ and $F_2$ are perpendicular to the two spatial vectors $V_1$ and $V_2$, respectively, and that their moduli are given by:

$$|F_1| = \frac{1}{|V_2 \sin\theta|}, \text{ and} \tag{1a}$$

$$|F_2| = \frac{1}{|V_1 \sin\theta|}; \tag{1b}$$

where θ represents the angle between the vectors $V_1$ and $V_2$, which is also equal to the angle between the frequency vectors $F_1$ and $F_2$. In general, the moduli $|F_1|$ and $|F_2|$ are real numbers.

Also, the area A of the parallelogram encompassed by $V_2$ and $V_1$ can be represented as:

$$A = |V_1 V_2 \sin\theta|. \tag{2a}$$

Alternately, the area A of the parallelogram can be written as a function of the spatial coordinates $x_1$, $y_1$, $x_2$ and $y_2$; i.e., as:

$$A = |x_1 y_2 - x_2 y_1|. \tag{2b}$$

Correspondingly, using Eqs. (2a) and (2b), Eqs. (1a) and (1b) can be recast as:

$$|F_1| = \frac{|V_1|}{A}, \text{ and} \tag{3a}$$

$$|F_2| = \frac{|V_2|}{A}. \tag{3b}$$

The vectors $F_1$ and $F_2$ can be decomposed into their scalar components as:

$$f_{x1} = \frac{-y_1}{A}, \tag{4a}$$

$$f_{y1} = \frac{x_1}{A}, \tag{4b}$$

$$f_{x2} = \frac{-y_2}{A}, \text{ and} \tag{4c}$$

$$f_{y2} = \frac{x_2}{A}. \tag{4d}$$

Therefore, Eqs. (4a)–(4d) express the frequency-to-spatial-component relationship for a cell defined by the spatial vectors $V_1$ and $V_2$. Although, in general, the frequency components, $f_{x_1}$, $f_{y_1}$, $f_{x_2}$, and $f_{y_2}$ are real numbers, they are also rational numbers completely defined by the four integer coordinate values, $x_1$, $y_1$, $x_2$ and $y_2$. Since Eqs. (4a)–(4d) describe a corresponding "mapping" of the frequency components to the spatial components, it should be appreciated that any analysis of the moiré-free conditions in the frequency domain can be easily translated into a spatial domain specification. It should be appreciated that, while the above equations are developed in relation to a non-orthogonal single-cell halftone dot having a parallelogram-like shape, it is apparent that the above equations may suitably describe other non-parallelogram shaped dots, for example, squares, rectangles, triangles, ellipses, etc., without departing from the spirit or scope of this invention.

Figure 3:
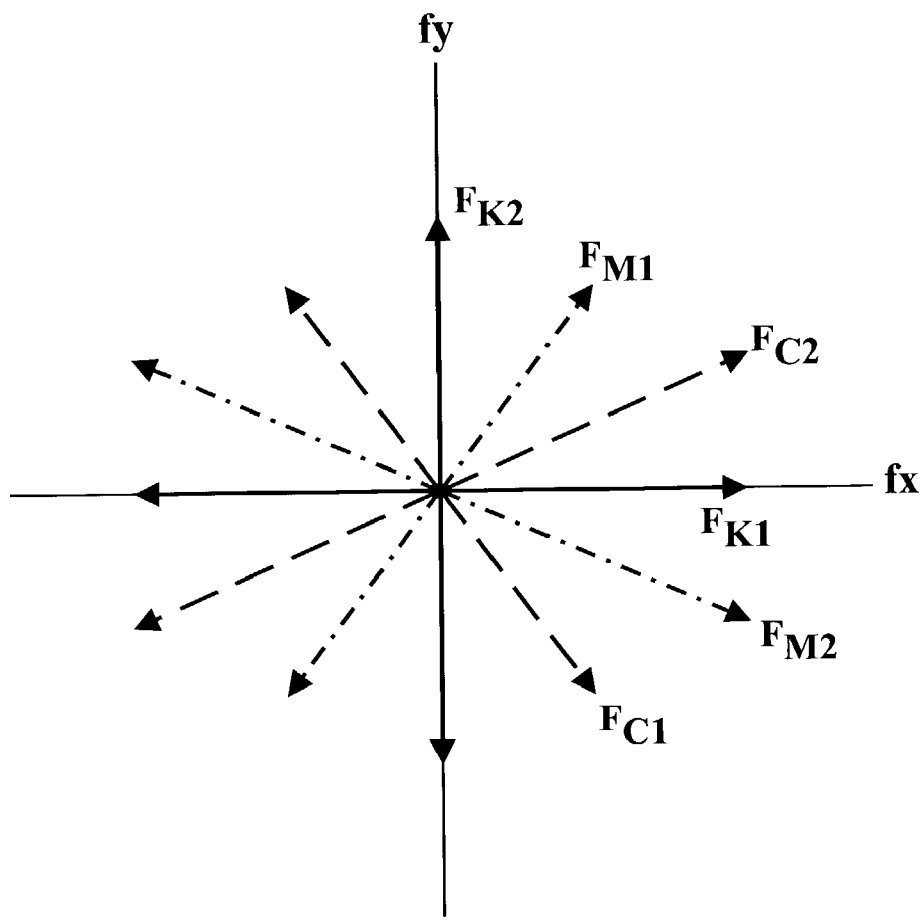
FIG. 3 illustrates a frequency domain representation of three single-cell halftone screens.

To this end, FIG. 3 is an exemplary vector representation in the frequency domain of three parallelogram halftone cells in the spatial domain used in the cyan (C), magenta (M), and black (K) color separations, respectively. The use of these three colors is exemplary and other three-color combinations could be used as well. As shown in FIGS. 1 and 2, the cyan, magenta, and black parallelogram single-cell halftone screens can be represented by pairs of spatial vectors $V_{C1}$ and $V_{C2}$, $V_{M1}$ and $V_{M2}$, and $V_{K1}$ and $V_{K2}$, respectively, corresponding to the frequency vector pairs $F_{C1}$ and $F_{C2}$, $F_{M1}$ and $F_{M2}$, and $F_{K1}$ and $F_{K2}$, respectively.

From FIG. 3, it is apparent that, to substantially reduce the likelihood of any three-color moiré occurring in any image printed using three single-cell halftone screens, the frequency vectors of the three-color separations, for example, cyan, magenta and black, should satisfy the following vector equations:

$$F_{C1}+F_{M1}+F_{K1}=0, \text{and} \quad (5a)$$

$$F_{C2}+F_{M2}+F_{K2}=0 \quad (5b)$$

Figure 4:
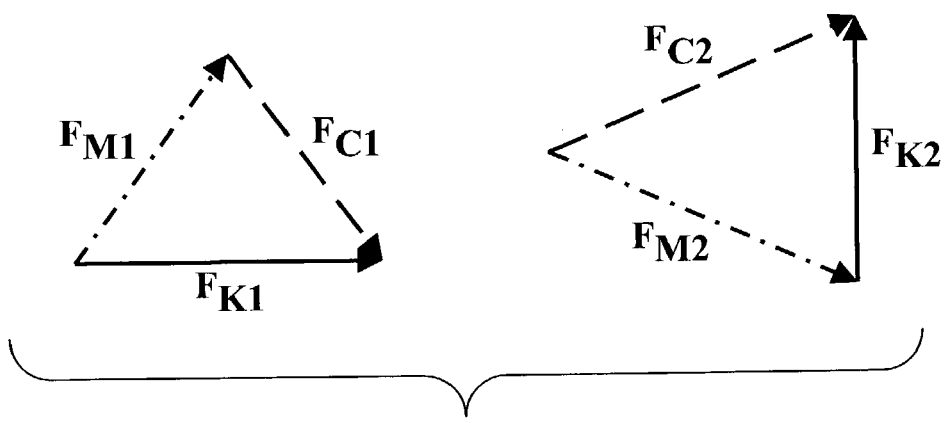
FIG. 4 illustrates an exemplary frequency domain representation of FIG. 3 constrained to satisfy moiré-free conditions.

FIG. 4 is a vector diagram illustrating the exemplary moiré-free vector relationships defined in Eqs. (5a) and (5b). It should be appreciated from frequency analysis that, for any frequency vector $F(f_x, f_y)$ there is always a conjugate frequency vector $F(-f_x, -f_y)$, hereafter denoted as $-F$. Therefore, it should also be appreciated that the two vectors $F$ and $-F$ are exchangeable. Further, it should be appreciated that the arbitrary indices 1 and 2 may be exchanged between the two frequency vectors $F_1$ and $F_2$ in each color separation. Thus, Eqs. (5a) and (5b) can be considered as a general description for the three-color moiré-free condition, which can include all other possible combinations, such as, for example, the following Eqs. (5c) and (5d):

$$F_{C2}+F_{M1}-F_{K1}=0, \text{ and} \quad (5c)$$

$$F_{C1}-F_{M2}-F_{K2}=0 \quad (5d)$$

Solutions to equations 5(a)–(d) are described in the previously cited U.S. applications Ser. Nos. 09/698,104 and 09/909,319, already incorporated by reference. The solutions to these equations provide a three-color moiré-free solution. However, for most purposes, a fourth color separation still needs to be screened. It is desirable to screen the fourth color such that two-color and three-color moiré patterns do not appear in the finished product. To reduce the chances that such moiré patterns will appear, a halftone dot of the fourth color can be specified by the same two fundamental frequency vectors as one of the first three color dots, i.e., a dot of the fourth color would have same halftone screen angle and frequency as one of the first three color dots. However, the phase of the fourth color dot should be shifted to limit any potential two-color separation registration moiré pattens that could be caused by misregistration of a printing engine.

For example, for a CMYK color output, where the C, M, and K separations have already been screened to reduce three-color moiré, the yellow (Y) separation still needs to be screened. To reduce the possibility that two-color and three-color moiré patterns will appear between Y and any of the other separations, a halftone dot corresponding to yellow can be specified by the same two fundamental frequency vectors as a halftone dot corresponding to C, M, or K (i.e., the Y dot has the same screen angle and frequency of a halftone dot corresponding to C, M, or K), but with a shifted phase. In embodiments, the yellow halftone dot is chosen to be specified by the same two fundamental frequency vectors as the screen corresponding to a black (K) separation.

In embodiments, The phase shift of the Y screen is accomplished by altering the fill-in sequences corresponding to the threshold array of the Y screen. FIG. 5 illustrates an example of this method of generating a phase shift. FIG. 5 illustrates an exemplary embodiment of a fill-in sequence for a K screen 1 and four possible corresponding fill-in sequences 2, 4, 6, 8 for a Y screen. A four-level threshold array was chosen for simplicity, but fill-in sequences corresponding to any number of thresholds may be used. Further, the arrays illustrated in FIGS. 5 and 6 correspond to orthogonal screens. Again, orthogonal screens are not necessary for the present invention. However, an orthogonal fill-in sequence is simpler to illustrate and these fill-in sequences are exemplary in nature.

Each of the four fill-in sequences 2, 4, 6, 8 are such that a K dot and a Y dot corresponding to the same location would not overlap unless the combined dot area coverage of the Y and K separations is greater than 100%. In other words, if 2 out of 4 threshold array elements of the K dot were filled-in and 2 out of 4 threshold array elements of the Y dot were filled-in there would be no overlap. If the Y screen had the same fill-in sequence as the K screen, the yellow would not be visible when the black dot coverage was greater than or equal to that of the Y screen. By choosing a Y screen that has minimal overlap with the K screen, we maximize coverage for both the Y and K separations. Because the Y screens have the same two frequency vectors as the K screens, the objectionable two-color moirés between Y and CMK are substantially avoided since their dot angles are either separated widely (more than 15°) or are in same angle. The objectionable CMY 3-color moirés are also avoided since CMY dots also satisfied "3-color moiré-free" conditions, i.e., $$F_{C1}+F_{M1}+F_{Y1}=0, \text{ and} \quad (6a)$$

$$F_{C2}+F_{M2}+F_{Y2}=0. \quad (6b)$$

Obviously, for larger threshold arrays, the number of acceptable permutations gets larger. In some cases, for larger threshold arrays, the fill-in sequences may not have to be designed so that overlap occurs only when the combined dot area coverage of the separations is 100%. In some cases, limiting overlap to cases where the combined dot area coverage is at least 75% may suffice. For a fill-in sequence having 16 levels, this would correspond to overlap occurring when the $7^{th}$ threshold level of either separation is reached when both are already at the $6^{th}$ level. In some cases limiting the combined dot area of coverage to at least 50% may suffice. For a fill-in sequence having 16 levels, this would correspond to overlap occurring when the $5^{th}$ threshold level of either separation is reached when both are already at the $4^{th}$ level.

Figure 7:
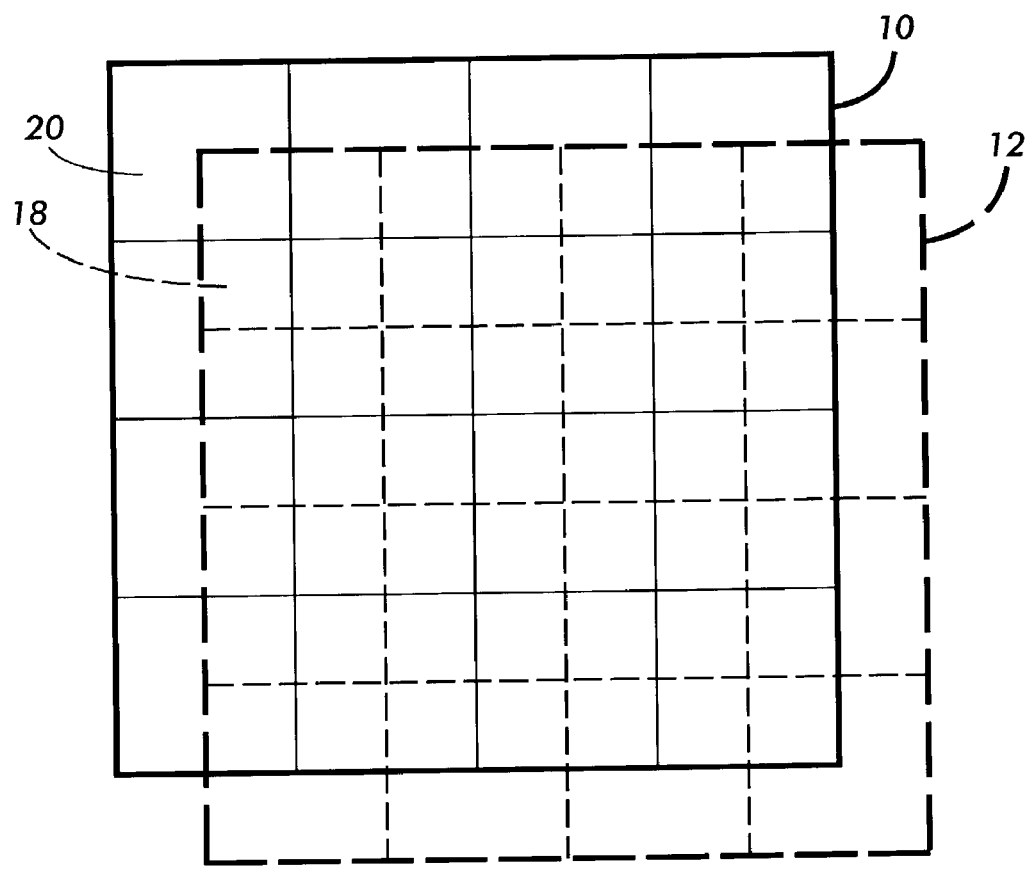
FIG. 7 illustrates a grid of yellow screens superimposed over a grid of black screens.
Figure 8:
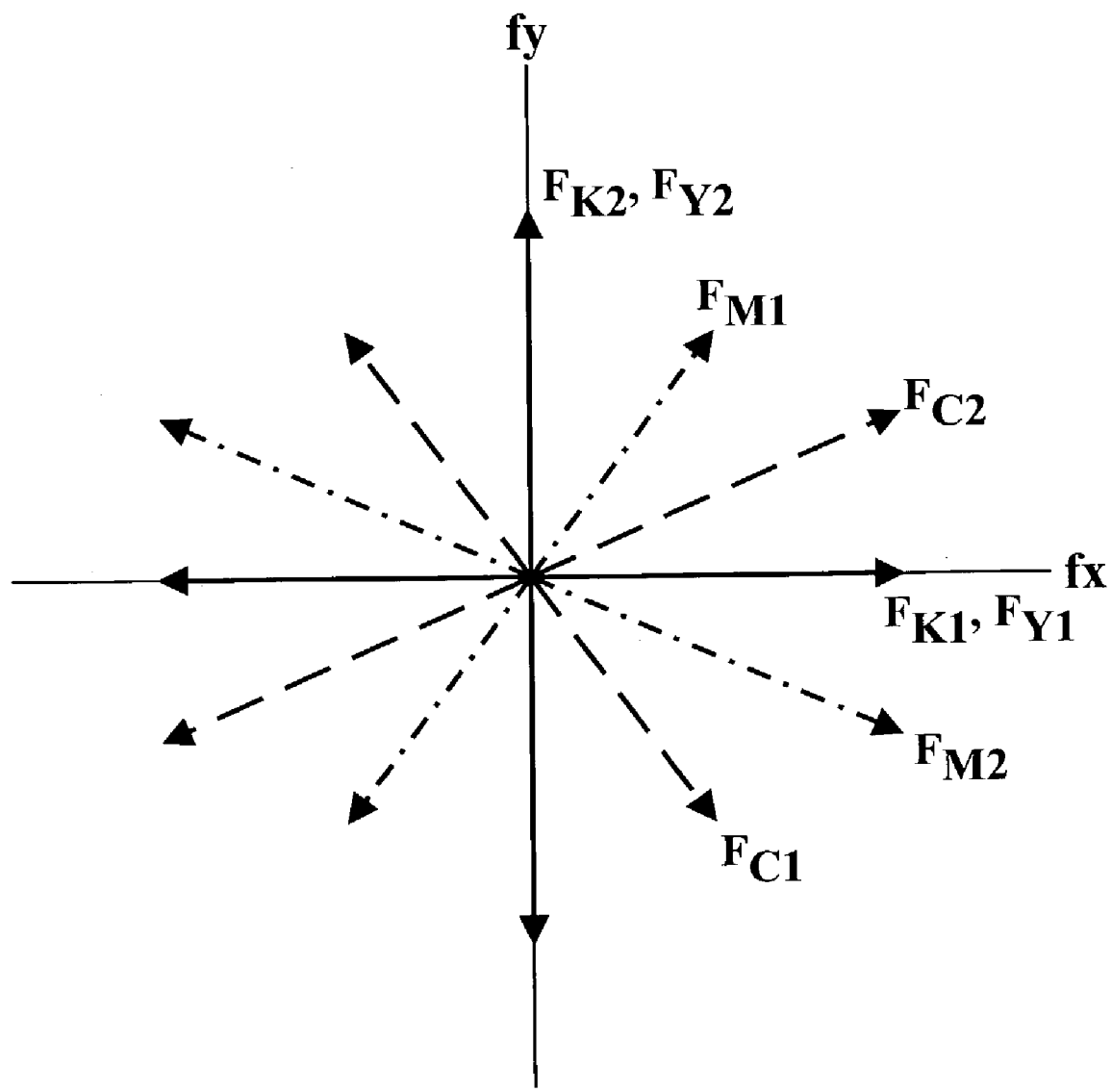
FIG. 8 illustrates a frequency domain representation of four single-cell halftone screens wherein frequency vectors corresponding to the yellow screen are superimposed over those corresponding to the black screen.

In some cases, where a physical screen was used, the threshold array of the Y screens could be physically shifted from the K screens to cause minimal Y and K dot overlap. FIGS. 6 and 7 illustrate a particular example that has a geometric simplicity to it, such that rather than a halftone screen being used, an actual physical screen may be used. In FIG. 6, we see a first fill-in sequence 14 that corresponds to a black color halftone screen and a second fill-in sequence 16 that corresponds to a yellow color halftone screen. FIG. 6 illustrates a fill-in sequence 16 where the quadrants of the fill-in sequence 14 have been interchanged. For example, in FIG. 6, the upper left quadrant 22 of the fill-in sequence 16 corresponds to the lower right quadrant 24 of the fill-in sequence 14. This method achieves the same effect as physically translating the screen pattern, but does not introducer any of the errors that can occur when a physical change in the system is introduced.

FIG. 7 depicts a grid of cells (or screens) 12 corresponding to yellow superimposed over a grid of cells (or screens)

10 corresponding to black. The black and yellow cells are drawn orthogonally for ease of explanation. However, the methods described herein also apply where the cells are nonortbogonal. The frequency vectors corresponding to the black screen were chosen for ease of illustration purposes and the methods disclosed herein is just as useful even where the screens are not rectangular. Each of the array of solid-bordered squares represents a screen corresponding to the K separation. Each of the array of dashed-bordered squares represents a screen corresponding to the Y separation. In FIG. 7, each yellow screen is moved approximately half a screen to the right and half a screen down from a corresponding black screen. This means that each quadrant of a yellow screen overlaps the diagonally opposite quadrant of a black screen. For example, the upper left quadrant of the yellow screen 18 corresponds to the lower right quadrant of the black screen 20. This physical shift corresponds to the change in the Y screen fill-in sequence shown in FIG. 6. In FIG. 7, the center point of each Y screen lies midway between the center point of each K screen as shown in FIG. 5.

One example of yellow screen selection for CMY dots for 600×600 dpi is detailed as follows:

| Cyan: | $V_{C1} = (2, -3)$, | $V_{C2} = (4, 2)$; |
|---|---|---|
| Magenta: | $V_{M1} = (4, -2)$, | $V_{M2} = (2, 3)$; |
| Black: | $V_{K1} = (4, 0)$, | $V_{K2} = (0, 4)$; |
| Yellow: | $V_{Y1} = (4, 0)$, | $V_{Y2} = (0, 4)$; | with corresponding frequency vectors:

| Cyan | $F_{C1} = -56.3°$, | 135.2 lpi | $F_{C2} = 26.6°$, | 167.7, lpi; |
|---|---|---|---|---|
| Magenta | $F_{M1} = -26.6°$, | 167.7 lpi | $F_{M2} = 56.3°$, | 135.2 lpi; |
| Black | $F_{K1} = 0°$, | 150 lpi | $F_{K2} = 90°$, | 150 lpi; |
| Yellow | $F_{Y1} = 0°$, | 150 lpi | $F_{K2} = 90°$, | 150 lpi. |

Other combinations of colors may be chosen for reducing the three-color and two- color moiré patterns. For example, the CYK three-color moiré-free equation may be satisfied and the angle and frequency of the magenta dots may be made to coincide with the cyan dots. However, because there may be potential registration problems with the printing engine, CM moiré patterns may appear. To minimize the possible registration moiré between two separations using screens with the same angle and frequency, Y is generally best to choose as the fourth color given that the CMK separations satisfy the three-color moiré-free equation, where the Y screen is a phase shifted version of the K screen. Y and K dots will be least likely to overlap and YK misregistration will be less noticeable than for any other two-color combinations, since yellow is a less-luminescent color while black is the most-luminescent color.

With Under-Color Removal (UCR) and Gray Component Replacement (GCR) technique implementation, moir& patterns due to YK misregistration will be further avoided in some neutral balance colors and dark colors, since the chances that Y and K dots overlap occurred in these colors will be further reduced. The present method is also much less likely to produce an ugly rosette pattern than if a line screen were employed.

While the present invention has been described with reference to specific embodiments thereof, it will be understood that it is not intended to limit the invention to these embodiments. It is intended to encompass alternatives, modifications, and equivalents, including substantial equivalents, similar equivalents, and the like, as may be included within the spirit and scope of the invention.

What is claimed:

1. A method for generating four-color images, comprising:
    associating three halftone screens with three color separations, where each screen comprises halftone cells specified by two spatial vectors, $V_{n1}$ and $V_{n2}$, separated by an angle $\theta_n$,
    where n=a, b, c, where a, b, and c are three arbitrary color indices;
    where $V_{n1}$ and $V_{n2}$ have corresponding frequency vectors $F_{n1}$ and $F_{n2}$ associated therewith, and
    where the frequency vectors satisfy the following equations $$F_{a1}+F_{b1}+F_{c1}=0, \text{ and}$$

$$F_{a2}+F_{b2}+F_{c2}=0$$

where the subscripts 1 and 2 are arbitrary and interchangeable;
    associating a fourth halftone screen with a fourth color separation, wherein the fourth halftone screen comprises halftone cells specified by two vectors separated by the angle $\theta_a$, such that the two vectors have corresponding frequency vectors $F_{a1}$ and $F_{a2}$ associated therewith.

2. The method of claim 1, where the fourth color separation corresponds to yellow.

3. The method of claim 2, where the color indicia a corresponds to the color black.

4. The method of claim 1 wherein the fourth halftone screen is the same size, shape, and orientation as the screen having frequency vectors $F_{a1}$ and $F_{a2}$, but its position is offset relative to that screen.

5. The method of claim 4, where the fourth halftone screen is offset such that not more than 50% of each fourth halftone cell overlaps 50% of a particular halftone cell of the screen having frequency vectors $F_{a1}$ and $F_{a2}$.

6. The method of claim 1, where the halftone cells of the fourth color screens have associated fill-in sequences,
    where the halftone cells of the screen having frequency vectors $F_{a1}$ and $F_{a2}$ have associated fill-in sequences
    where the fill-in sequences of the halftone cells of the fourth color halftone screen and the fill-in sequences of the screen having frequency vectors $F_{a1}$ and $F_{a2}$ are such that the color separation corresponding to the fourth halftone screen and the color separation corresponding to the screen having frequency vectors $F_{a1}$ and $F_{a2}$ do not overlap until a combined dot area coverage of the separations is greater than 50%.

7. The method of claim 6, where the fill-in sequences of the halftone cells of the fourth color halftone screen and the fill-in sequences of the screen having frequency vectors $F_{a1}$ and $F_{a2}$ are such that the color separation corresponding to the fourth halftone screen and the color separation corresponding to the screen having frequency vectors $F_{a1}$ and $F_{a2}$ do not overlap until a combined dot area coverage of the separations is greater than 100%.

8. The method of claim 1, where the halftone cells of the fourth color screen and the halftone cells of the screen having frequency vectors $F_{a1}$ and $F_{a2}$ are orthogonal.

9. A method for reducing moiré patterns in four-color images, comprising:

identifying first, second, and third halftone screens that correspond to first, second, and third color separations,
where the first, second, and third color separations are different from each other, and
where the screens are oriented such that three-color moiré patterns are minimized;
identifying a fourth halftone screen corresponding to a color separation different from that of the first, second, and third color separations;
where the fourth halftone screen is the same as one of the first, second, and third halftone screens, but is altered such that the color separation corresponding to the fourth halftone screen and the color separation corresponding to the one of the first, second, and third halftone screens do not overlap until a combined dot area coverage of the separations is greater than 50%.

10. The method of claim 9, where the fourth halftone screen is altered such that the color separation corresponding to the fourth halftone screen and the color separation corresponding to the one of the first, second, and third halftone screens do not overlap until a combined dot area coverage of the separations is greater than 100%.

11. The method of claim 9, where the position of the fourth halftone screen is shifted with respect to the one of the first, second, and third halftone screens.

12. A system for reducing moiré patterns in four-color images, comprising:
first, second, and third arrays of halftone screens, each halftone screen corresponding to a color different from that of the other screens, and each halftone screen having an associated fill-in sequence.
where the first, second, and third arrays have characteristics such that no three-color moiré patterns are formed;
a fourth array of halftone screens having an associated fill-in sequence, the fourth array of screens corresponding to a color different from that of the first second, or third arrays,
the fourth halftone array superimposed over one of the first, second, and third arrays;
where the fill-in sequences for the halftone screens of the fourth array are such that the color separation corresponding to the fourth halftone screens and the color separation corresponding to the one of the first, second, and third halftone screens over which the fourth halftone screen is superimposed do not overlap until a combined dot area coverage of the separations is greater than 50%.

13. The system of claim 12, where the color separation corresponding to the fourth halftone screens and the color separation corresponding to the one of the first, second, and third halftone screens over which the fourth halftone screen is superimposed do not overlap until a combined dot area coverage of the separations is greater than 100%.

14. The system of claim 13, where the halftone screens of the fourth array correspond to yellow.

15. The system of claim 14, where the one of the first, second, and third arrays over which the fourth array of halftone screen is superimposed corresponds to black.

16. The system of claim 13, where the halftone screens of the fourth array are orthogonal.

17. A method for halftoning an image, comprising:
receiving image data comprising a plurality of color separations;
comparing image data for a first separation to a first halftone screen characterized by a first pair of frequency vectors;
comparing image data for a second separation to a second halftone screen characterized by a second pair frequency vectors;
comparing image data for a third separation to a third halftone screen characterized by a third pair of frequency vectors;
comparing image data for a fourth separation to a fourth halftone screen characterized by a fourth pair of frequency vectors;
where the fourth pair of frequency vectors are identical to one of the first, second, or third pair of frequency vectors.

18. The method of claim 17, where the fourth halftone screen corresponds to a yellow separation.

19. The method of claim 18, wherein the fourth frequency vectors are identical to the frequency vectors of a screen for a black separation.

20. The method of claim 17, wherein the fourth halftone screen is the same size, shape, and orientation as one of the first, second, or third screens, but its position is offset relative to that screen.

21. The method of claim 17,
where the first, second, third and fourth halftone screens have an associated fill-in sequence, and
where the fill-in sequences of the fourth halftone screen are such that overlap between the separation corresponding to the fourth halftone screen and the separation corresponding to the one of the first, second, and third halftone screens to which the fourth halftone screen has an identical pair of frequency vectors does not occur until a combined dot area coverage of the separations is greater than 100%.

22. The method of claim 21, where the first, second, and third frequency vectors are chosen such that no three-color moiré patterns are formed.

* * * * *